United States Patent [19]
Lefevre

[11] Patent Number: 5,975,621
[45] Date of Patent: Nov. 2, 1999

[54] VEHICLE HOOD SHIELD

[75] Inventor: Robert H. Lefevre, 17825 SW. Cody La., Aloha, Oreg. 97007

[73] Assignee: Robert H. Lefevre, Beaverton, Oreg.

[21] Appl. No.: 08/734,513

[22] Filed: Oct. 18, 1996

[51] Int. Cl.$^6$ ................................. B60J 9/00
[52] U.S. Cl. ........................................ 296/136
[58] Field of Search .................. 290/136; 280/770

[56]           References Cited

U.S. PATENT DOCUMENTS

| | | | |
|---|---|---|---|
| 4,043,587 | 8/1977 | Gaillourakis et al. | 296/91 |
| 4,052,099 | 10/1977 | Lowery et al. | 296/91 |
| 4,063,773 | 12/1977 | Modesette | 296/91 |
| 4,153,129 | 5/1979 | Redmond | 180/68.6 |
| 4,547,013 | 10/1985 | McDaniel | 296/180.1 |
| 4,621,860 | 11/1986 | Gerst | 296/91 |
| 4,776,627 | 10/1988 | Hutto et al. | 296/91 |
| 4,952,006 | 8/1990 | Willey | 296/91 |
| 5,039,156 | 8/1991 | Messmore et al. | 296/91 |
| 5,158,324 | 10/1992 | Flesher | 296/136 X |
| 5,280,989 | 1/1994 | Castillo | 296/136 |

*Primary Examiner*—Andrew C. Pike

[57]           ABSTRACT

A hood shield for motor vehicles and the like comprises a layer of flexible, magnetically impregnated material to which is contiguously bonded a soft emulsion layer, the whole being cut in the general shape of a vehicle hood and including V-shaped cuts along the rearward edge thereof to facilitate placement onto a vehicle hood without bunching. Elongate edge trim material, including an inner flap thereof to facilitate imposition of a forced fit, is used to hold together the outer edge of the hood shield and the outer edge of the hood. Closing of the hood holds said edge trim material with enclosed hood shield edge against the remainder of the vehicle thereby inhibiting theft of the device.

4 Claims, 2 Drawing Sheets

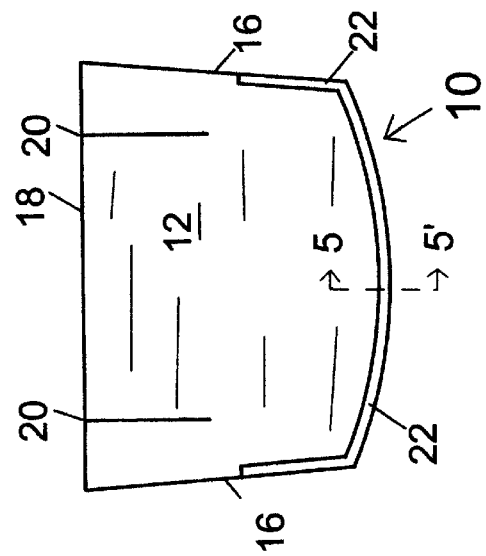
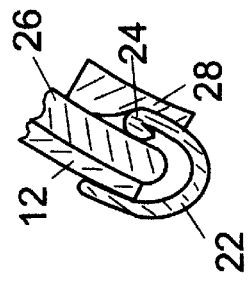
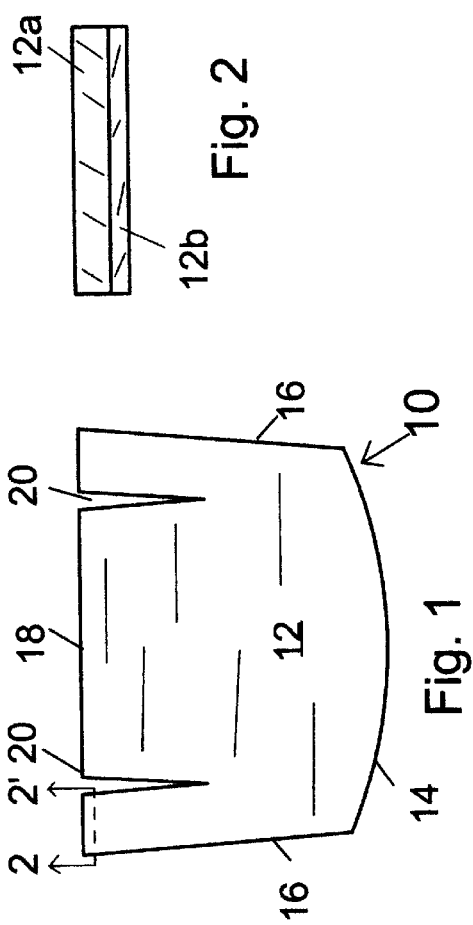
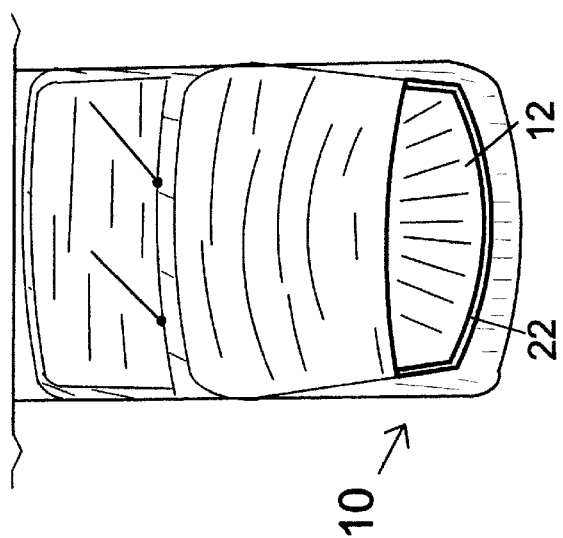
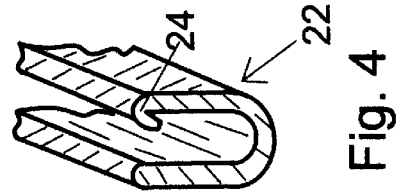

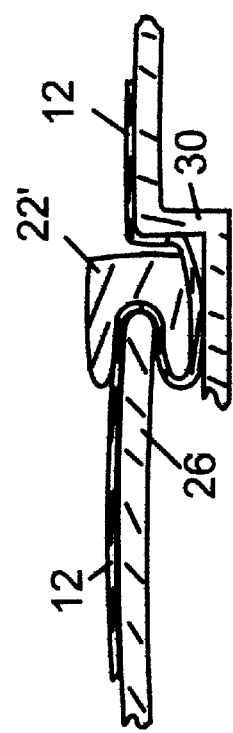
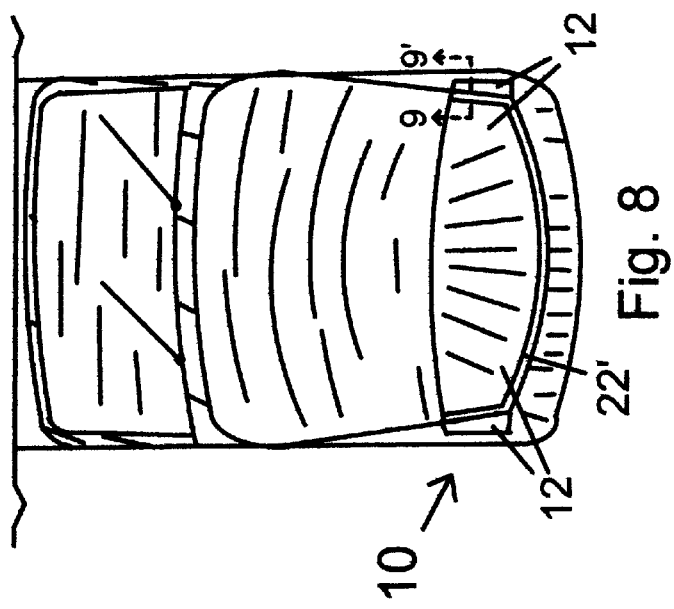
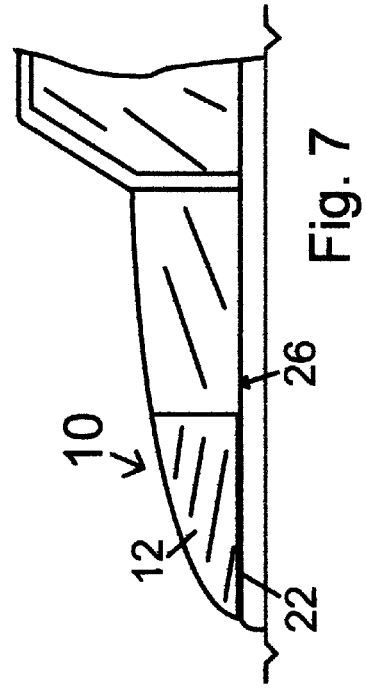

VEHICLE HOOD SHIELD

BACKGROUND OF THE INVENTION

1. Field of the Invention

This invention relates to the protection of the hoods of motor vehicles from rock damage, insects, and the like. More specifically, the invention relates to a hood cover or shield adapted to fit over a vehicle hood, wherein the cover or shield is held in place by a magnetic force in direct contact with the outer surface of the hood, and by an edge trim device between the front and side peripheries of the hood and the car body so as to require the shield to conform to the curvature of the hood, while also preventing theft.

2. Background Information

The hoods of motor vehicles, and particularly the surface paint thereof, are subject to road damage by way of flying rocks or insects or the like, wherein damage may be caused either by way of dents arising from direct physical impact of rocks, pieces of wood, or other types of road debris that act as missiles, or by chemical action caused by the remains of insects that have impacted onto the paint surface. As a means of avoiding such damage, various "bug deflectors" and the like have been conceived, some such devices consisting either of a single curved or bent board-like structure, or pairs of board-like structures, often arranged in a "V" centered near to the front center of the hood and sloping backwards both outwardly and vertically so as to deflect upwards and outwards the stream of air passing by the vehicle hood. The means for mounting such structures may involve brackets or the like that extend under the hood, together with short struts or "feet" that are placed against the hood surface. Among the consequences of using such devices are aerodynamic loss, since the device serves as an obstacle to the laminar flow for which vehicle hoods are designed. In addition, the "feet" of such devices tend to collect grit, leaves, twigs, acidic road components, or insect pieces in the vicinity thereof, so that instead of protecting the hood the device may in fact have helped to cause damage thereto, i.e., by concentrating in particular spots the very elements that can cause hood and paint damage. Ordinary vehicle vibration will also cause any such "feet" to rub against the hood surface and cause wear thereon.

Another type of hood protection device is found in the "bra", by which is meant a flexible soft felt backing sheet (used to protect the painted surface) overlaid by vinyl and cut to the shape of a hood, said device being held in place by elastic cords that have hooks at the distal ends thereof that are placed beneath the hood, some of such devices also being adapted to cover over portions of the grill, front bumper, and fenders. Also, "snaps" may be disposed as parts of the bra in the vicinity of the wheel wells, the material of the bra being bent around to the interior of the wheel well so as to permit attaching such snaps to complementary snap members mounted therein, or "L-shaped" connectors or tabs may also be used. Although such devices may be effective in preventing or at least minimizing damage caused by actual impacts of rocks and the like, a major characteristic of such devices is that very little "seal" is provided around the perimeter of the bra; hence grit and the like tend to accumulate between the bra and the hood surface, whereupon the normal vibratory movements of the bra relative to the hood will again increase the amount of paint damage that can be caused. Moreover, the tendency of the soft felt backing material to absorb and retain moisture and fine grit renders the bra very difficult to be cleaned of such damaging components, and without very frequent and thorough cleaning such moisture and grit will themselves cause significant paint damage. In addition, since such devices are typically attached by cords and hooks that are easily accessible, these devices are subject to being stolen.

What is needed and would be useful, therefore, is a hood protection device that avoids some or all of the aforementioned disadvantages, while yet providing a useful degree of protection to the hood surface. In view of the minimal occurrence of rock or chemical damage relative to the plastic-like materials in typical use now for bumper or bumper covers and grills, and similar lesser damage to fenders in view of their flexible structure and their partial shielding by the headlight and turning light structures, such a protection device may be adapted for use solely or at least predominantly in relation to the hood surface, and particularly the front portion thereof, said front portion constituting approximately 90 percent of the vehicle surface below the windshield that is likely to sustain such damage. Such a protection device need not cover the entirety of the hood surface, inasmuch as rocks and other debris that are thrown up from a road surface do not typically reach above the lower "nose" portion of the hood, and higher flying insects that are not impacted by that nose portion are more likely to impinge upon the windshield than on the remaining hood surface.

SUMMARY OF THE INVENTION

The invention comprises a method and apparatus for hood protection that uses a thin, magnetically attached material for hood protection, said material also being held in place by means of U-shaped edge trim material that holds together the mutual peripheries of the protective material and the hood, specifically around the "nose" and a portion of the hood sides. Upon closing the hood, that edge material is compressed between the edges of the hood and the facing portions of the car body, thereby inhibiting theft of the device. The protective material is backed by a soft, nonporous latex shield that isolates the paint surface from the magnetic surface, thereby protecting the paint surface from damage without introducing any tendency for accumulation of moisture or the like thereon.

BRIEF DESCRIPTION OF THE DRAWINGS

The preferred embodiments of the invention will now be described in detail with reference to the accompanying drawings, in which:

FIG. 1 is a top plan view of a hood shield having V-cut shaping slits along the rearward edge thereof.

FIG. 2 is a cutaway view of a portion of the hood shield material taken through the line 2–2' of FIG. 1 showing laminated magnetic and latex layers.

FIG. 3 is a top plan view of a vehicle hood and hood shield being held thereon by means of edge trim material.

FIG. 4 is a perspective view of an end of the edge trim material of FIG. 3.

FIG. 5 is a cutaway view of a forward portion of the vehicle hood and hood shield taken along the lines 5–5' of FIG. 3.

FIG. 6 is a schematic front perspective view of a motor vehicle hood bearing the hood shield of FIG. 3.

FIG. 7 is a schematic side elevation view of a motor vehicle hood bearing the hood shield of FIG. 3.

FIG. 8 is a schematic front perspective view of a motor vehicle hood bearing a hood shield analogous to that shown in FIG. 3 except that the hood shield extends outwardly onto adjacent fenders.

FIG. 9 is a cutaway view taken through the line 9–9' of FIG. 8 of an end portion of the hood shield shown to extend beyond a vehicle hood and over a portion of a fender.

DETAILED DESCRIPTION OF THE INVENTION

FIG. 1 shows in top plan view a hood shield 10, essentially comprising a planar sheet 12 having a rounded "nose" edge 14, opposite sides 16, and a rearward edge 18 along which are disposed V-cut slots 20, which have a separated portion contiguous with rearward edge 18 and an apex disposed towards nose edge 14. Sheet 12 preferably comprises a rubber based, magnetically impregnated vinyl material such as that manufactured under the trade name "SAFEMAG®" by Flexmag Industries, Inc., of Cincinnati, Ohio, which is often used for the alternative purpose of providing advertising signs and the like on the side doors of vehicles. As shown in FIG. 2, sheet 12 advantageously includes both a magnetic material 12a proper and a coterminous coating of a water-based latex emulsion material 12b which acts as a safety barrier between the magnetic material proper and the painted vehicle surface. Unlike the kind of felt material previously noted to be used in other hood protection devices, emulsion material 12b is impervious to water and does not include interstitial regions that would likely collect dirt and grit so as to cause damage to the underlying painted surface.

FIG. 3 is likewise a top plan view of hood shield 10, except in this case hood shield 10 has been folded over the front surface of a vehicle hood. It can be seen that V-cut slots 20 close together when hood shield 10 is so folded over a hood, thereby preventing "bunching" of material when the plane surface of hood shield 10 as disclosed in FIG. 1 is bent into a curve to fit the top of the vehicle hood. By having such a nearly precise correspondence between the shape of hood shield 10 and the hood of the vehicle, there is very little aerodynamic loss, so that the purposes of lesser wind resistance and resultant fuel economy that underly the concepts of hood design are not circumvented as may occur with other hood protection devices.

Also shown in FIG. 3 is a length of edge trim 22 that extends across front edge 14 of sheet 12 and alongside both sides 16 thereof. A perspective drawing of an end of edge trim 22 is shown in FIG. 4, and is seen to comprise an elongate U-shaped structure having a similarly elongate, inwardly facing flap 24. Edge trim 22 is adapted to hold together two or more essentially plate-like structures having mutually aligned outer edges, and since the combined thicknesses of such structures may be less than the distance between the arms of the "U" of edge trim 22, flexible flap 24 serves to bring about a force fit of such structures within edge trim 22. That is, flap 24 is sufficiently flexible to be bent aside when the edges of two or more such plate-like structures are forced into the space within the interior "U" of edge trim 22, and the restoring force generated from so bending flap 24 serves to hold edge trim 22 against outwardly facing sides of those two or more structures, i.e., to hold such structures firmly within edge trim 22.

FIG. 5 shows in cross section a forward portion of sheet 12 and edge trim 22 as shown in FIG. 3, and specifically wherein edge trim 22 is used to hold together forward edge 14 of sheet 12 and a corresponding forward hood edge 26. (For clarity in the drawings, the dual structure of sheet 12 as comprising a magnetic material 12a and an emulsion material 12b as noted in FIG. 2 is not further shown.) In applying edge trim 22 for such purpose, it is preferable to employ that side of the U-shape thereof that bears flap 24 on the "under" side of hood edge 26, inasmuch as the effect of flap 24 is to leave that side of the U-shape separated somewhat from the material being held. That is, such a gap is preferable relative to the under side of hood edge 26 than to the outer surface of hood shield 10, since dust and dirt may enter into any such gap, and one prefers to have that occur beneath the hood where no damage can be done rather than in the vicinity of the painted outer hood surface. Moreover, the under surface of the periphery of a hood will often be provided with sponge rubber spacers 28 under which edge trim 22 may be inserted, as is also shown in FIG. 5, spacer 28 then further compressing together the indicated gap between edge trim 22 and hood edge 26.

FIG. 6 shows in perspective view the front portion of a motor vehicle with hood shield 10 mounted thereon, and FIG. 7 shows a left side elevation view of the front portion of a vehicle with hood shield 10 so mounted. FIGS. 8 and 9 show an alternative disposition of sheet 12 wherein the material thereof is of sufficient lateral width to extend across the upper surface of a hood 26 and then further out past an interior point that is held in mutual contiguity with the hood by edge trim 22' and then onto a surface of a fender 30, such disposition of course being provided on both sides of the vehicle. In FIGS. 8 and 9, unlike in FIG. 3, edge trim 22' (which in this case is not shown to include a flap 24) is shown as extending to the rear of the vehicle as far as does sheet 12, but such illustration is not intended to be a limiting feature, inasmuch as both sheet 12 and edge trim 22' (or 22) may be of dimensions to extend as far around hood edge 26 as may be desired, even though, of course, edge trim 22 would ordinarily not be made to extend beyond a point to which sheet 12 extends.

It will be understood by those of ordinary skill in the art that other arrangements and disposition of the aforesaid components, the descriptions of which are intended to be illustrative only and not limiting, may be made without departing from the spirit and scope of the invention, which must be identified and determined only from the following claims and equivalents thereof.

I claim:

1. A hood shield adapted to cover over an outer surface of a vehicle hood, said hood shield comprising:

a planar sheet of flexible, magnetically impregnated material having dimensions to fit the outer surface of the vehicle hood, said dimensions including a generally straight rearward edge and a generally rounded frontward edge;

said planar sheet further comprising one or more elongate V-shaped cuts disposed along said rearward edge, each of said cuts including a separated portion contiguous with said rearward edge and an apex disposed towards said frontward edge, whereby said planar sheet may conveniently be bent into a curved disposition so as to fit onto the vehicle hood; and said planar sheet further comprising a layer of emulsion material contiguously bonded to and being coterminous at an outer periphery thereof with said magnetically impregnated material.

2. The hood shield of claim 1 further comprising an elongate edge trim material having a U-shape wherein an interior of said U-shape is adapted to receive along a length thereof one or more coterminous edges of respective one or more contiguous, essentially planar structures.

3. The hood shield of claim 2 wherein said edge trim material further comprises a tip at opposite ends of said U-shape, and one of said tips further comprises a flexible flap directed generally inwardly towards another of said tips.

4. The hood shield of claim 2 wherein said planar sheet has a dimension between opposite sides thereof in excess of a lateral dimension between outer edges of the vehicle hood onto which said hood shield is installed, whereby said planar sheet includes an interior point that can be held in mutual contiguity with an outer edge of said vehicle hood within said edge trim material while a portion of said planar sheet extends further outwardly onto a fender of a motor vehicle.

* * * * *